United States Patent [19]

Blümle

[11] Patent Number: 4,735,404

[45] Date of Patent: Apr. 5, 1988

[54] CLAMPING DEVICE FOR WORKPIECES

[76] Inventor: Rudi Blümle, Schwarzbachstrabe 52, 7000 Stuttgart 80, Fed. Rep. of Germany

[21] Appl. No.: 923,647

[22] Filed: Oct. 27, 1986

[30] Foreign Application Priority Data

Sep. 4, 1986 [EP] European Pat. Off. ........ 86112274.5

[51] Int. Cl.⁴ ........ B23Q 3/02

[52] U.S. Cl. ........ 269/137; 269/253

[58] Field of Search ........ 269/137, 210, 253

[56] References Cited

U.S. PATENT DOCUMENTS

| | | | |
|---|---|---|---|
| 1,746,153 | 2/1930 | Hampton | 269/253 X |
| 2,634,175 | 4/1953 | Kennedy | 269/253 X |
| 4,489,927 | 12/1984 | Yamada et al. | 269/137 |

FOREIGN PATENT DOCUMENTS

| | | | |
|---|---|---|---|
| 145123 | 12/1902 | Fed. Rep. of Germany | 269/137 |
| 443859 | 1/1949 | Italy | 269/137 |
| 1693 | of 1903 | United Kingdom | 269/210 |
| 5432 | of 1907 | United Kingdom | 269/137 |

*Primary Examiner*—Frederick R. Schmidt
*Assistant Examiner*—Judy J. Hartman
*Attorney, Agent, or Firm*—McAulay, Fields, Fisher, Goldstein & Nissen

[57] ABSTRACT

In connection with a clamping device for parts, workpieces, molds, or the like, it is proposed to guide the clamping element on both sides in laterally arranged sliding rails of a bearing block which are disposed in inclined position, sloping from the rear towards the front. The bearing block is seated on a base body mounted on a base plate of a modular clamping system or another support. For the purpose of relative adjustment of the clamping element on the bearing block, a threaded element is provided which is in threaded engagement with at least one of the said parts and which bears against the other one of said parts.

10 Claims, 3 Drawing Sheets

CLAMPING DEVICE FOR WORKPIECES

DESCRIPTION OF THE PRIOR ART

The present invention starts out from a clamping device for parts, workpieces, molds, or the like, as defined by the preamble of the main claim. A low-pressure clamping device of this type has been known before, (see leaflet "Sind hohe Vorrichtungskosten und Rüstzeiten Ihr Problem" ("Do you have problems with high tooling costs and set-up times?"), blüco technik 86, page 20). It comprises a base body arranged to be fixed on a base plate forming part of a modular clamping system, for example by means of screw bolts or hexagon socket screws. The base body carries a bearing block comprising two inclined sliding surfaces in axially spaced arrangement. A clamping element seated on the bearing block exhibits similar inclined sliding surfaces so that it can be fixed, depending on its position relative to the bearing block, either in a forward—viewed towards the workpiece—and lower position or in a more rearward and, then, higher position. For fixing purposes and for the purpose of producing the pressure required, for example, for clamping a workpiece, there is provided a screw which can be screwed into the bearing block so as to exert a pressure upon the clamping element from above, via the screw head which is considerably enlarged by a corresponding washer, so that the clamping element is urged downwards and towards the workpiece along the inclined surfaces forming oblique planes. However, this forward movement of the clamping element is rendered possible only because the bore receiving the clamping screw in the clamping element offers ample play, in any case in the direction of displacement, which means that it takes the form of an oblong hole. The displacement is, however, limited in this case by the contour of the oblong hole, and generally it may be a problem with the known low-pressure clamping device that the clamping element is held only loosely, at any rate as long as it does not engage the workpiece to be clamped under pressure, which means that being merely retained in an oblong hole it is not guided in any manner on the bearing block.

As regards the clamping technology for workpieces, parts, molds, or the like—the field where the present invention also finds its preferred applications—reference is made generally to the following publications: Paper by Gallien/Hammer entitled "Wirtschaftlich Rüsten von Baukastenvorrichtungen am Arbeitsplatz" ("Setting up modular devices economically at the workplace") published in "tz für Metallbearbeitung" 1983, No. 5, or the paper by Schwolgin entitled "Rasterspannsystem mit CAD-gestützter Programmkontrolle reduziert Maschinenrüstzeiten" ("Modular clamping system with CAD-assisted program control reduces machine set-up times") published in "dima", No. 6/86, pages 126–134.

Apart from the known low-pressure clamping device, there are a number of other clamping devices used for mounting dies or workpieces on modular clamping plates which find their application in the construction of jigs and fixtures, in metal cutting processes, in the preparation of operations at bench workplaces, or the like, for example a particular "blüco" clamping device, see page 19 of the before-mentioned leaflet, which comprises a clamping element which is held in the bearing block to pivot about a fulcrum point and which is urged forwardly, by a threaded bolt, about the fulcrum point and towards the workpiece, the threaded bolt acting from the outside upon the pivoted clamping element and being held only by threaded engagement with the bearing block, or a ball-type clamping device comprising a clamping strip which is held above a base strip and which can be urged downwards by the screwing action of nuts or studs so as to exert a pressure in the area of two forwardly arranged semi-spheres.

Now, it is the object of the present invention to provide a clamping device in which the clamping element is precisely guided in the bearing block and which nevertheless provides the possibility, by turning a threaded element by a greater or lesser degree, to cause the clamping element to perform a simultaneous movement in two planes, i.e. towards the part to be clamped, for example the workpiece, and downwardly.

ADVANTAGES OF THE INVENTION

The present invention achieves this object with the aid of the characterizing features of the main claim and provides the advantage that while keeping the structure simple, the clamping elements can be guided and adjusted precisely in the bearing block, the latter being in turn seated in sliding relationship on a base body.

It is another particular advantage of the invention that no frictional effects make themselves felt adversely during clamping. Such frictional effects could be encountered, for example, when the respective inclined sliding surfaces along which the clamping element slides on the bearing block obstruct the relative movement between the clamping element and the bearing block. In the case of the known low-pressure clamping element, such an obstruction may also result from the threaded bolt which necessarily has to urge the clamping element downwards by means of its head and which, due to the resulting friction, may under certain circumstances thereby prevent the clamping element from sliding downwardly along the bearing block.

The present invention further eliminates a problem which is encountered with all low-pressure clamping devices of the described type and which is seen in the fact that the inclined surfaces used must be comparatively steep to permit the relative sliding movement to take place and to prevent the sliding movement from being blocked by friction.

The present invention also permits particularly flat relative sliding movements between the clamping element and the bearing block, for example a movement at an angle of only 15° from a rearward upper position to a forward lower position, so that, depending on the selected angle, the relation between the axial feed motion and the pressure exerted in a vertically downward direction (the two actions being performed simultaneously in the case of low-pressure clamping devices) can be freely selected.

Another advantage of the invention is seen in the fact that in spite of precise lateral guides for the clamping element, the device nevertheless is operated only by a single set screw.

The features described by the subclaims provide advantageous improvements and developments of the clamping device defined by the main claim. A particular advantage is seen in the easy motion of the clamping element which slides along lateral rails which are mounted in the bearing block stationarily, at a given inclination, i.e. in a tilted or oblique position ensuring that the desired displacement of the clamping element is achieved, both from the top to the bottom and in the direction of the object to be clamped, it being possible to select freely the distribution of the components of motion, i.e. the linear partial component in the direction towards the object to be clamped, and the vertical partial component in the direction from the top to the bottom. The lateral sliding rails may have any desired shape and may also be formed integrally with the bearing block. Preferably, they are designed as round guide tubes taking the form of hardened guiding pins with a specially treated, for example mirror-finished surface, and are arranged in semi-circular recesses on the insides of the bearing block which has in this case the general shape of a U, and extend into the rear connecting web between the two legs of the bearing block sufficiently far to fix the sliding pins precisely in place. According to another embodiment of the invention, the sliding pins may be fastened in the bearing block in addition by clamping screws, preferably hexagon socket screws, inserted from the rear. The clamping element as such is provided in this case with lateral, correspondingly inclined, preferably integrally formed recesses of likewise semi-circular shape which then permits the clamping element to perform its combined sliding motion via the sliding pins.

DESCRIPTION OF THE DRAWING

One embodiment of the invention will be described hereafter in greater detail with reference to the drawing in which:

FIG. 5 shows a side view of the clamping element guided in restrained relationship in the bearing block and FIG. 7 shows a rear view of the clamping element illustrated in FIG. 6, i.e. from the left viewed in the drawing plane of FIG. 6

DESCRIPTION OF THE ILLUSTRATED EMBODIMENTS

The basic concept of the invention consists in guiding the clamping element forcedly in the bearing block at the desired inclination by means of lateral guide rails, retaining it safely and with high precision in its guides, even against the action of high back pressures, and providing at the same time trouble-free operation, i.e. permitting the clamping elements to be displaced in the combined clamping directions.

Figure 1:
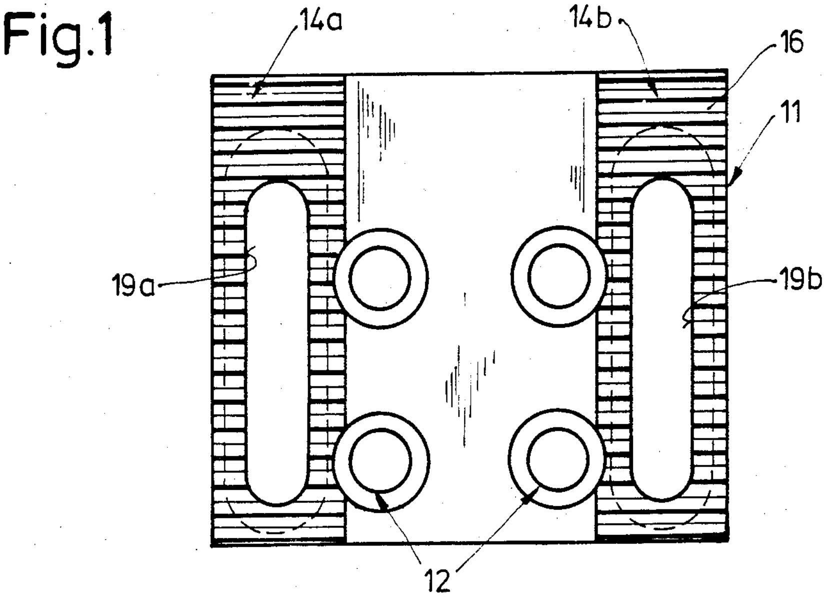
FIG. 1 shows a top view of the base body of the clamping device.
Figure 2:
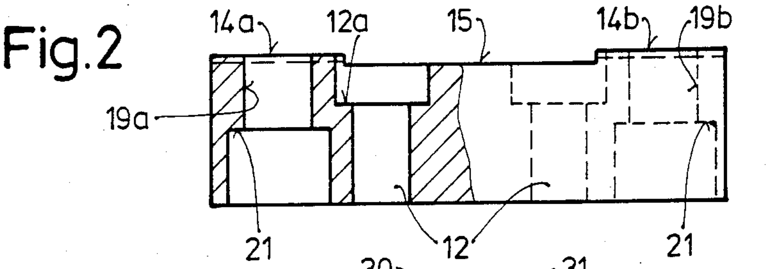
FIG. 2 shows a front view, and partial section, of the base body illustrated in FIG. 1.

In the illustration of FIG. 1, the base body of the clamping device 10 (see FIGS. 8 and 9), which receives and carries the bearing block in adjustable relationship, is designated by reference numeral 11. The base body 11 comprises means permitting it to be mounted on the base plate of a modular clamping system, for example, in the form of stepped threaded bores 12 which in the case of the substantially rectangular block shape of the base body used in this case may consist of four threaded bores provided in suitable distribution. These threaded bores serve to mount the base body in the conventional manner on a suitable modular clamping plate or another base plate. To this end, screws, preferably hexagon socket screws, of a suitable size may be screwed into the said threaded bores down to the shoulder 12a so that they will not make themselves felt in a disturbing manner when the clamping device is completed later and during adjustment of the clamping element.

Figure 4:
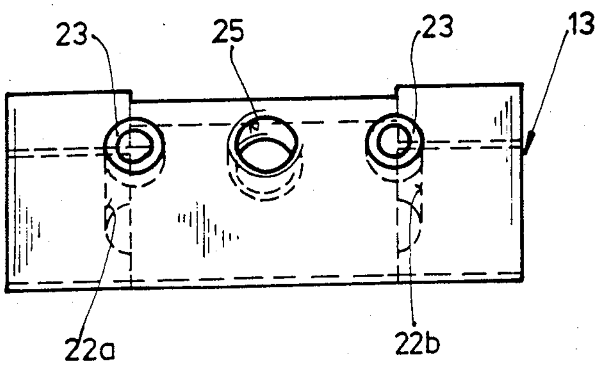
FIG. 4 shows a rear view of the bearing block illustrated in FIG. 3, i.e. a view from the operating side of the clamping element retained in the bearing block.
Figure 5:
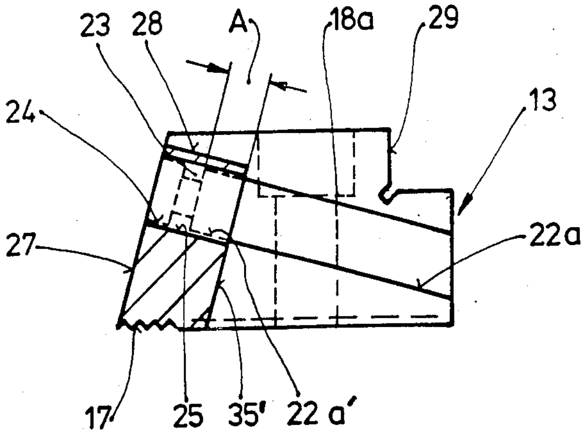
FIG. 5 shows a section through the bearing block illustrated in FIG. 3, taken along line V—V in FIG. 3.

The upper face of the base body 11 carries a bearing block 13 (see FIGS. 3 to 5) which is connected with the base body 11 by means of two external threaded bolts. The bearing block 13 rests on external, raised longitudinal areas 14a, 4b of the base body 11 including between them a slightly recessed surface 15. The raised portions 14a, 14b are provided with an upwardly directed toothing 16, for example a prismatic 90° toothing with a pitch of 1/16". This upwardly directed toothing 16 on the two longitudinally extending carrying surfaces 14a, 14b is matched by a downwardly directed toothing 17 on the bearing block 13 (see FIG. 5), which provides a first possibility for coarse adjustment of the position of the bearing block 13 on the base body 11. This coarse adjustment is effected by placing the bearing block on the base body in the desired position, which is then fixed against displacement by the matching toothings 16, 17, and mounting it thereafter finally by means of one threaded bolt provided on each side which is passed through corresponding threaded openings 18a, 18b in the bearing block and through oblong holes 19a, 19b provided on both sides of the base body. There are further provided two sliding blocks 20 (see FIG. 9) which take the form of nuts extended in the direction of the oblong holes 19a, 19b (for preventing rotational movement) and which secure these threaded bolts (not shown in the drawing) fastening the bearing block 13 from the bottom in the oblong holes 19a, 19b of the base body 11. The sliding blocks 20 rest against the lower shoulders 21 in the oblong holes 19a, 19b.

Figure 3:
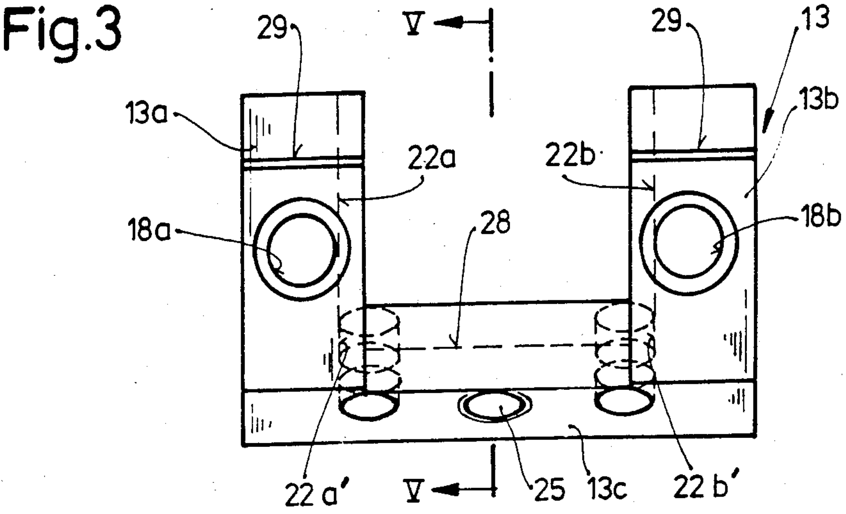
FIG. 3 shows a top view of the bearing block to be fastened on the base body illustrated in FIG. 1

As is apparent from FIG. 3, the bearing block 13 which rests on the base body 11 and which is connected with the latter in the manner described before, exhibits the general shape of a U consisting of two legs 13a and 13b which are interconnected by a web portion 13c. The two stepped bores 18a, 18b for receiving the threaded mounting bolts are provided in each of the legs 13a, 13b in an approximately central position. Further, as can be seen best in FIG. 5, the bearing block is provided on both inner faces of the legs with recesses 22a, 22b which are inclined, relative to the horizontal plane, from a rearward to a forward point (forward means in this case in the direction of the object to be clamped), i.e. which exhibit an inclination at a given angle. In the embodiment illustrated in the drawings, these recesses 22a, 22b serve to receive sliding pins which are to be engaged therein. However, instead of the recesses, the bearing block may also be provided with inwardly projecting guide rails of an initially general type, provided, however, in the same arrangement and at the same inclination as the before-described recesses (the sliding pins to be received by the recesses 22a, 22b are also to be understood as guide rails for these purposes), for receiving the clamping element, which will be described in detail further below, in sliding relationship.

In the area of the web portion of the U, the recesses 22a, 22b take the form of bores. To facilitate their production, they are, therefore, given a semi-circular cross-section in the areas of the inner faces of the legs. These semi-circular recesses 22a, 22b serve to receive the guide pins—not shown in the drawing for the sake of clarity—forming the guide rails or round guide tubes whose complementary cross-section is then received on both sides by the semi-circular recesses 22a, 22b and also, over a pre-determined length, by the extension of the bores 22a', 22b' in the web portion 13c. This arrangement can be seen best in FIG. 5 which, although representing a cross-section through a central threaded bore, indicates in dashed lines the bore 22a' in the background. This bore extends a distance A from the inner face of the web portion of the U into the latter. It is then followed by an inwardly protruding annular projection 23 followed by a portion 24 where the diameter of the bore is enlarged again, for example to the same diameter as before. The reason for this arrangement is to be seen in the fact that the sliding pins which are inserted on both sides of the legs into the bores 22a' to the depth A abut against the annular projection 23, while a screw, preferably a hexagon socket screw, is introduced from the other side, i.e. into the bore 24, and screwed into a matching central threaded bore provided in each sliding pin to secure the sliding pins against displacement initially in the semicircular recesses 22a, 22b of the two legs 13a, 13b and then of course also in the full bores in the web portion 13c.

The structure of the bearing block 13 is then completed by a central bore 25 provided in the web portion 13c and comprising an internal thread serving to receive a set screw for displacing the clamping element. The set screw is shown at 26 in FIG. 10 and will be described in greater detail further below.

For reasons resulting from the oblique displacement of the clamping element, which will be described in greater detail further below, the rear surface 27 of the connecting web 13c is inclined in such a manner that the surface extends perpendicularly to the threaded bore 25 and, besides, also to the bores 22a', 22b'. Further, the upper surface 28 of the connecting web is also inclined downwardly to match the inclination of a recess 29 of a rear projection 30 provided on the clamping element 31, as shown in FIG. 6.

Figure 8:
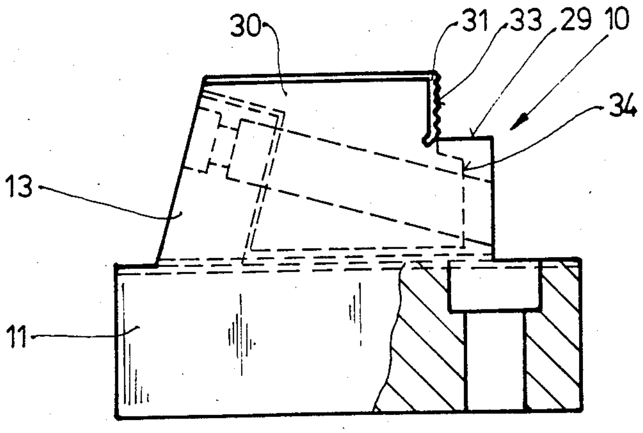
FIG. 8 shows a side view of, and partial section through, the assembled embodiment of the clamping device.
Figure 9:
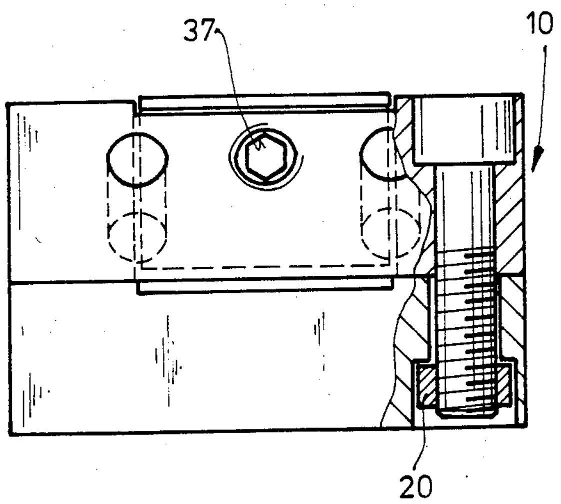
FIG. 9 shows a rear view of, and partial section through, the assembled clamping device illustrated in FIG. 8.

Finally, it should be noted that the two legs 13a, 13b comprise on their front ends, i.e. in the direction of the object to be clamped, a substantially rectangular or square recess 29 which in the completely retracted position of the clamping element, as shown in FIG. 8, matches the stepped shape of the forward face of the clamping element so that the latter has easy access to the object to be clamped.

Figure 6:
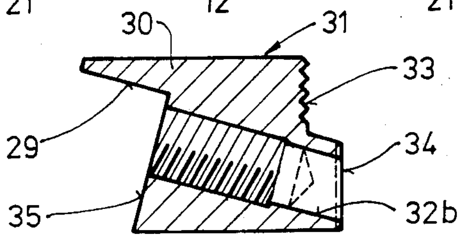
Figure 7:
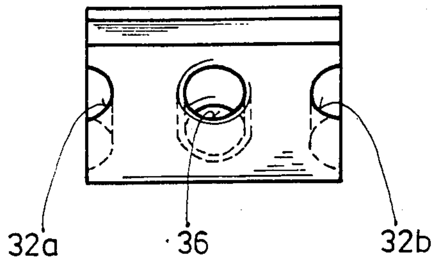

The clamping element as such is designed in the manner illustrated by the side view of FIG. 6. It fits snugly into the space formed between the two legs 13a, 13b of the U shape of the bearing block and is provided with lateral recesses 32a, 32b matching the sliding pins projecting semi-circularly from the inner faces of the bearing block so that the clamping element received between the two legs of the bearing block is permitted to slide along the guide rail arrangements provided on its both sides, simultaneously from the front to the rear and from the top to the bottom, following the inclination of the sliding pins which can be adjusted as desired and which in the present case has been set to, preferably, 15°.

The clamping element 31 exhibits a block shape comprising mutually stepped front faces 33 and 34 intended to engage the object or the workpiece to be clamped. Preferably, both front clamping faces 33, 34 are toothed to prevent slipping.

A rear stop face 35 comes to rest against the inner inclined face 35' of the connecting web 13c of the bearing block 13 when the clamping element 31 is in its fully retracted position. In this position, the rearwardly protruding projection 30 of the clamping element 31 also occupies a position fully above the upper inclined face 28 of the connecting web 13c. This projection covers the inner space of the U shape of the bearing block also when the clamping element occupies its extreme forward position, preventing in this manner foreign matter, for example chips in the case of metal cutting operations, from penetrating into this space.

Figure 10:
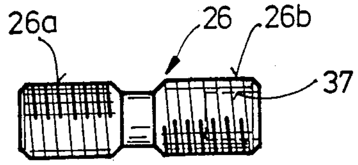
FIG. 10 shows the threaded actuating element by means of which the displacement of the clamping element in the bearing block is effected.

The fine adjustment of the clamping element 31 is then effected by engagement of the threaded element 26 shown in FIG. 10—which has already been mentioned before—with the threaded bore 25 in the bearing block on the one hand and a correspondingly aligned central threaded bore 36 in the clamping element 31 on the other hand. The two external threads 26a, 26b of the threaded element 26 are oppositely directed, i.e. one left-hand and one right-hand thread, and the threads of the bores 25 and 36 are designed correspondingly so that while being designed as fine threads with small pitch they nevertheless permit the clamping elements to be displaced along their lateral sliding pins both sensitively and quickly, by rotating the threaded element 26. This rotation is effected on the bearing block 13 from the rear where the threaded element, which preferably is provided in this case with a hexagon screw socket 37, can be seen in the representation of the assembled condition of FIG. 9.

It goes without saying that the present invention can be modified in many different ways. For example, the lateral guide rails may also be designed as inclined lateral projections of the clamping element engaging in this case corresponding guide recesses provided on the inside of the legs 13a, 13b of the U of the bearing block 13.

Further, it is also possible to provide the threaded element 26 only with a single thread and to mount it in this case stationarily in one of the parts performing the mutual relative movement, i.e. the bearing block or the clamping element, for example by engagement of an inner annular shoulder of the bore in an annular recess provided on the threaded element, so that during rotation the displacement is effected only by the engagement of the one thread with the said other part.

All features described in the specification, the following claims and shown in the drawing may be essential to the invention individually and in any combination thereof.

I claim:

1. A clamping device for a workpiece comprising a base body mounted on a support, a bearing block, mounting means for mounting said bearing block on said base in a selected one of a plurality of different positions, said bearing block having spaced apart arms in facing relationship to each other, opposed semicircular inclined recesses in each arm, a respective pin received in each recess and having a portion extending into the space between said arms, and a clamping element between said arms and having surfaces in facing relationship thereto and arranged for inclined sliding movement with respect thereto, said clamping element being provided with opposed recessed in said facing surfaces that receive the extended portions of said pins therein in sliding engagement, and a threaded member engaging said clamping element relative to the base and the block and said block for effecting movement of said element upon rotation of said threaded member.

2. Clamping device according to claim 1, characterized in that the bearing block (13) is designed in U shape.

3. Clamping device according to claim 1, characterized in that the base body comprises lateral oblong holes (19*a*, 19*b*), said mounting means including clamping screws extending from the bearing block and arranged for being displaced relative to the base body in the direction of the oblong holes provided therein, and sliding blocks in said base threadedly engaging said screws to maintain said screws in position.

4. Clamping device according to claim 3, characterized in that contacting surfaces of the lower base body (11) and the bearing block (13) mounted thereon are provided with meshing teeth (16,17) for fixing the body and the bearing block relative to each other.

5. Clamping device according to claim 1, characterized in that the bearing block (13) comprises two lateral legs (13*a*, 13*b*) and a connecting web the rear thereof (13*c*) interconnecting the two legs, said semicircular recesses (22*a*, 22*b*) receiving the sliding pins extend in the form of full bores (22*a*', 22*b*') into the inner surfaces of the legs in the connecting web (13*c*).

6. Clamping device according to claim 5, characterized in that the semicircular recesses (22*a*, 22*b*) and the full bores (22*a*', 22*b*',) extending into the connecting web (13*c*) are inclined downwardly at a pre-determined angle (15°) from the rear towards the front.

7. Clamping device according to claim 5, characterized in that full bores forming extensions of the semicircular recesses (22*a*, 22*b*) in the lateral legs (13*a*, 13*b*) of the bearing block (13) are interrupted by an inwardly protruding annular projection (23) which forms bearing faces for the pins extending from the sides of the legs, and set screws extending from an outer surface of the connecting web (13*c*) and screwed into the pins.

8. Clamping device according to claim 1, characterized in that the clamping element is eceived flush in the space between the two legs (13*a*, 13*b*) of the bearing block and provided with lateral semi-circular recesses matching the inclination of the pins for receiving the pins, and arranged to slide along the pins.

9. Clamping device according to claim 5 characterized in that the web and said clamping element are provided with bores receiving said threaded member, said threaded member (26) for adjusting the clamping element is provided on both sides, up to a central separating line, with oppositely directed threads engaging correspondingly opposite threades provided in said threaded bore (25) in the connecting web (13*c*) and said threaded bore (36) in the clamping element (31) in such a manner that when turning the threaded member the threaded member is simultaneously threaded into or out of the bearing block and conversely into or out of the clamping element so that a relative adjusting speed between the bearing block and the clamping element per revolution of the threaded element is doubled.

10. Clamping device according to claim 1, characterized in that the clamping element (31) comprises a rear projection which in an extended position covers the space between legs.

* * * * *